United States Patent
Uwazumi et al.

(10) Patent No.: US 7,361,419 B2
(45) Date of Patent: Apr. 22, 2008

(54) SUBSTRATE FOR A PERPENDICULAR MAGNETIC RECORDING MEDIUM, PERPENDICULAR MAGNETIC RECORDING MEDIUM, AND MANUFACTURING METHODS THEREOF

(75) Inventors: Hiroyuki Uwazumi, Nagano (JP); Yasushi Sakai, Nagano (JP); Mitsuo Masuda, Nagano (JP); Norihiko Nakajima, Nagano (JP)

(73) Assignee: Fuji Electric Device Technology Co., Ltd. (JP)

( * ) Notice: Subject to any disclaimer, the term of this patent is extended or adjusted under 35 U.S.C. 154(b) by 164 days.

(21) Appl. No.: 10/772,082

(22) Filed: Feb. 4, 2004

(65) Prior Publication Data
US 2004/0234819 A1 Nov. 25, 2004

(30) Foreign Application Priority Data
Feb. 4, 2003 (JP) .............................. 2003-027486
Jul. 24, 2003 (JP) .............................. 2003-201242

(51) Int. Cl.
*G11B 5/66* (2006.01)
(52) U.S. Cl. .................... 428/831.1; 427/129; 427/130; 204/192.2
(58) Field of Classification Search ............. 428/831.1, 428/828, 831, 831.2, 846.4, 846.7, 832.3
See application file for complete search history.

(56) References Cited

U.S. PATENT DOCUMENTS 4,210,946 A 7/1980 Iwasaki et al. ............. 360/131
4,224,381 A * 9/1980 Patel et al. .................. 428/652
4,759,996 A 7/1988 Ogawa et al.
6,146,735 A 11/2000 Viggiano
6,432,562 B1 * 8/2002 Wu et al. .................... 428/826

(Continued)

FOREIGN PATENT DOCUMENTS

JP 58-91 B2 1/1983

(Continued)

OTHER PUBLICATIONS

Machine translation of JP 07-066034, Sakawa et al., Oct. 3, 1995.*

(Continued)

*Primary Examiner*—Holly Rickman
(74) *Attorney, Agent, or Firm*—Rossi, Kimms & McDowell, LLP

(57) ABSTRACT

A substrate for a perpendicular magnetic recording medium has a soft magnetic underlayer that functions as a soft magnetic backing layer of a perpendicular magnetic recording medium. The substrate for a perpendicular magnetic recording medium has a nonmagnetic base made of Al—Mg alloy or the like. The soft magnetic underlayer is formed of a Ni—P alloy containing phosphorus in a range of 0.5 wt % to 6 wt % formed by electroless plating on the nonmagnetic base. The substrate can also include a nonmagnetic underlayer formed by electroless plating on the base before electroless plating the soft magnetic underlayer. To form the perpendicular magnetic recording medium, the surface of the soft magnetic is textured using free abrasive grains. Thereafter, a nonmagnetic seed layer, a magnetic recording layer, and a protective layer can be formed by sputtering. A soft magnetic supplemental layer also can be formed on the soft magnetic underlayer before forming the seed layer.

30 Claims, 9 Drawing Sheets

U.S. PATENT DOCUMENTS 6,818,031 B2 * 11/2004 Oshima ..................... 51/308

FOREIGN PATENT DOCUMENTS

| JP | 61-179891 A | 8/1986 |
|---|---|---|
| JP | 62-009518 A | 1/1987 |
| JP | 64-52219 A | 2/1989 |
| JP | 1-285022 A | 11/1989 |
| JP | 5-1384 A | 1/1993 |
| JP | 5-67323 A | 3/1993 |
| JP | 7-66034 A | 3/1995 |
| JP | 10-228620 A | 8/1998 |

OTHER PUBLICATIONS

Relevant portion of Search Report of a corresponding application from the Patent Office of Ireland, dated Sep. 23, 2004.

Search Report from the Singapore Patent Office dated Jan. 20, 2005.

Notification of Reasons for Refusal issued in corresponding Japanese Patent Application No. 2003-201242, with mailing date Jun. 19, 2007.

* cited by examiner

SUBSTRATE FOR A PERPENDICULAR MAGNETIC RECORDING MEDIUM, PERPENDICULAR MAGNETIC RECORDING MEDIUM, AND MANUFACTURING METHODS THEREOF

BACKGROUND

A perpendicular magnetic recording system is drawing attention as a technology for achieving high density in magnetic recording, to replace a conventional longitudinal magnetic recording system. A double layer perpendicular magnetic recording medium, in particular, is known as a perpendicular magnetic recording medium suited for providing high density recording. See for instance, Japanese Patent Publication No. S58-91. The double layer perpendicular magnetic recording medium is provided with a soft magnetic film called a soft magnetic backing layer under a magnetic recording layer, which serves to record information. The backing layer facilitates to pass the magnetic flux generated by a magnetic head and has high saturation magnetic flux density Bs. The double layer perpendicular magnetic recording medium enhances magnetic field intensity and magnetic field gradient generated by a magnetic head, improves resolution of records, and increases leakage flux from the recording medium.

The soft magnetic backing layer is generally composed of an alloy film of Ni—Fe, or Fe—Si—Al, or an amorphous alloy film of mainly cobalt, formed by a sputtering method and has a thickness ranging 200 nm to 500 nm. However, forming such a relatively thick film by a sputtering method is unfavorable from the viewpoint of production cost and mass productivity.

To solve this problem, a soft magnetic backing layer formed of a soft magnetic film by an electroless plating method has been proposed. Feasibility of a soft magnetic backing layer is suggested with the proposed materials of Co—B film in Japanese Unexamined Patent Application Publication No. H5-1384 and Ni—Fe—P film in Japanese Unexamined Patent Application Publication No. H7-66034.

In a conventional magnetic recording medium of a longitudinal magnetic recording system that is used as a hard disk drive, a nonmagnetic substrate is provided with a nonmagnetic Ni—P plating film that contains phosphorus in a concentration of around 11 wt %, with a thickness of 8 µm to 15 µm formed on an aluminum alloy base by an electroless plating method. The nonmagnetic Ni—P plating film mainly serves to fill in the defects like depressions on the aluminum alloy base, as well as to obtain a smooth surface by polishing the surface of the plating film. Further, the nonmagnetic Ni—P plating film is used to secure hardness of the surface required for a substrate of a hard disk. A certain degree of surface hardness is required to prevent the substrate from damage in an event of collision of the magnetic recording medium with the magnetic head during operation of a hard disk drive.

Since the nonmagnetic Ni—P plating film can be made ferromagnetic by heating at a temperature of about 300° C. or higher, a proposal has been made to use the Ni—P plating film as a soft magnetic backing layer of a perpendicular magnetic recording medium. It has been proposed in Japanese Unexamined Patent Application Publication No. H1-285022 to form a soft magnetic Ni—P film by heat treating a nonmagnetic Ni—P plating film at a temperature of 300° C. or higher for use as a soft magnetic backing layer. It has been also proposed in Japanese Unexamined Patent Application Publication No. H10-228620 that by laminating a soft magnetic Ni—P film that is obtained by heat treating a nonmagnetic Ni—P plating film at a temperature between 250° C. and 500° C. and a Sendust film that is formed by sputtering, the Ni—P film helps the Sendust film exhibit its own function, to attain an effective soft magnetic backing layer.

The nonmagnetic Ni—P plating film has already been practically applied to a nonmagnetic substrate of a hard disk as described above. Thus, mass production methods and the surface smoothing technique by polishing are well known. Accordingly, the Ni—P plating film is very promising from the viewpoint of manufacturing cost if the plating film could be transformed to a soft magnetic backing layer by a heat treatment and could be considered for a substrate of a perpendicular magnetic recording medium.

To use the previously described Co—B plating film or Ni—Fe—P plating film for a soft magnetic backing layer, the surface needs to be polished smooth. Because the hardness and workability of these materials are foreseen to be substantially different from those of the nonmagnetic Ni—P plating film, the conventional processing technique for the nonmagnetic Ni—P plating film cannot be applied to process those materials.

For the materials, such as Ni—Fe, Co—Fe, or other alloys of two or more metal components, it is very difficult to control, for example, the composition of the plating bath in an electroless plating method, and thus the quality of such a material is difficult to control and maintain during the mass scale production.

The inventors of the present invention made extensive studies on the transformation of the nonmagnetic Ni—P plating film to a soft magnetic state by a heat treatment and found that the Ni—P plating film cannot be sufficiently transformed to soft magnetic state by heat treating at a temperature of 300° C. or less, and that heat treating at a temperature higher than 300° C., which is necessary to attain soft magnetic state, increases the surface roughness of the plating film. While a commonly used nonmagnetic Ni—P plating film has a homogeneous amorphous structure, heat treating the same to transform it to a soft magnetic state causes formation of both types of crystals of metallic Ni and intermetallic compound of $Ni_3P$. This structural change can be the reason for the increase in the surface roughness. The increase in the surface roughness increases the magnetic head's flying height, which needs to be at a low height to enable high density recording of a hard disk. Consequently, the plating film that is transformed to soft magnetic by such a method can be hardly utilized for a soft magnetic backing layer of a perpendicular magnetic recording medium.

While studies to reduce the surface roughness were made by polishing a Ni—P plating film after the heat treatment, a smooth surface was hardly obtained by polishing the film that was crystallized by the heat treatment. This is because the crystal of metallic nickel and the crystal of intermetallic compound $Ni_3P$ have different hardness and exhibit very different workability.

As described above, conventional technologies have been difficult to provide a backing layer of a perpendicular magnetic recording layer that allows high density recording with a low production cost and mass productivity. In addition, a soft magnetic plating film of a substrate for a perpendicular magnetic recording medium has to be designed to have the values of a surface roughness and a surface hardness that are appropriate to use for a substrate.

Accordingly, there remains a need for a technology to provide an effective backing layer for a perpendicular magnetic recording layer that allows high density recording. The present invention addresses this need.

SUMMARY OF THE INVENTION

The present invention relates to a perpendicular magnetic recording medium, which can be mounted on various magnetic recording apparatuses including an external storage device of a computer, particularly, a fixed magnetic disk device (hard disk drive), and to a method for manufacturing such a medium. The present invention also relates to a substrate for the perpendicular magnetic recording medium, and to a method for manufacturing such a substrate.

One aspect of the present invention is a substrate for a perpendicular magnetic recording medium. The substrate has a nonmagnetic base composed of an aluminum alloy, and a soft magnetic underlayer. A nonmagnetic underlayer composed of an Ni—P alloy can be formed between the base and the soft magnetic underlayer. The soft magnetic underlayer can be composed of a Ni—P alloy containing phosphorus in a range of 0.5 wt % to 6 wt %. The surface of the soft magnetic underlayer can have a surface roughness Ra of 0.5 nm or less and a micro waviness Wa of 0.5 nm or less.

When the soft magnetic underlayer is directly formed on the base, its thickness is 3 μm or greater. When the nonmagnetic underlayer is included, its thickness ranges 0.5 μm to 7 μm, the soft magnetic underlayer has a thickness of 0.3 μm or greater, and a sum of the thickness of the nonmagnetic underlayer and the thickness of the soft magnetic underlayer is 3 μm or greater. The nonmagnetic underlayer can be composed of Ni—P alloy containing about 11 wt % of phosphorus.

Another aspect of the present invention is a perpendicular magnetic recording medium formed with the above described substrate. The medium can include a nonmagnetic seed layer, a magnetic recording layer, and a protective layer sequentially formed on the substrate. A soft magnetic supplement layer can be formed between the soft magnetic underlayer of the substrate and the nonmagnetic seed layer. The soft magnetic underlayer functions as a soft magnetic backing layer. The soft magnetic supplement layer has a film thickness of 50 nm or less, and a product of the film thickness and a saturation magnetic flux density is 150 G μm or larger.

Another aspect of the present invention is a method of manufacturing the substrate for a perpendicular magnetic recording medium described above. The method can include providing the nonmagnetic base, and electroless plating a soft magnetic underlayer composed of a Ni—P alloy containing phosphorus in a range of 0.5 wt % to 6 wt % on the nonmagnetic base. A nonmagnetic underlayer composed of an Ni—P alloy can be electroless plated on the base before electroless plating the soft magnetic underlayer. The method can further include heating the substrate to a temperature of 300° C. or less for 30 minutes or longer after forming the soft magnetic underlayer. The method can further include polishing the surface of the soft magnetic underlayer using free abrasive grains to smooth the surface thereof.

Another aspect of the present invention is a method for manufacturing a perpendicular magnetic recording medium. The method can include forming a substrate as previously described, texturing the surface of the soft magnetic underlayer using free abrasive grains, and sequentially forming an optionally the nonmagnetic underlayer, the nonmagnetic seed layer, the magnetic recording layer, and the protective layer by sputtering.

The method can further include heating the substrate to a temperature of 300° C. or less for 30 minutes or longer after forming the soft magnetic underlayer.

DETAILED DESCRIPTION

The inventors of the present invention have made extensive studies and found that a substrate for a perpendicular magnetic recording medium with mass productivity, can function as a soft magnetic backing layer of a perpendicular magnetic recording medium, with sufficient surface hardness, when a soft magnetic underlayer has a thickness of 3 μm or greater, is composed of a Ni—P alloy containing phosphorus in the range of 0.5 wt % to 6 wt %, and is formed on a nonmagnetic base of an aluminum alloy by means of an electroless plating method.

The present inventors also have found that the same effects as described above can also be obtained, after forming a nonmagnetic underlayer of a Ni—P alloy on a nonmagnetic base of an aluminum alloy by electroless plating, by further forming a soft magnetic underlayer of a Ni—P alloy containing phosphorus in a range of 0.5 wt % to 6 wt % on the nonmagnetic underlayer. Here, the thickness of the nonmagnetic underlayer can be in the range of 0.5 μm to 7 μm, the thickness of the soft magnetic underlayer can be 0.3 μm or greater, and the sum of the thicknesses of the nonmagnetic underlayer and the soft magnetic underlayer can be 3 μm or greater.

Figure 1:
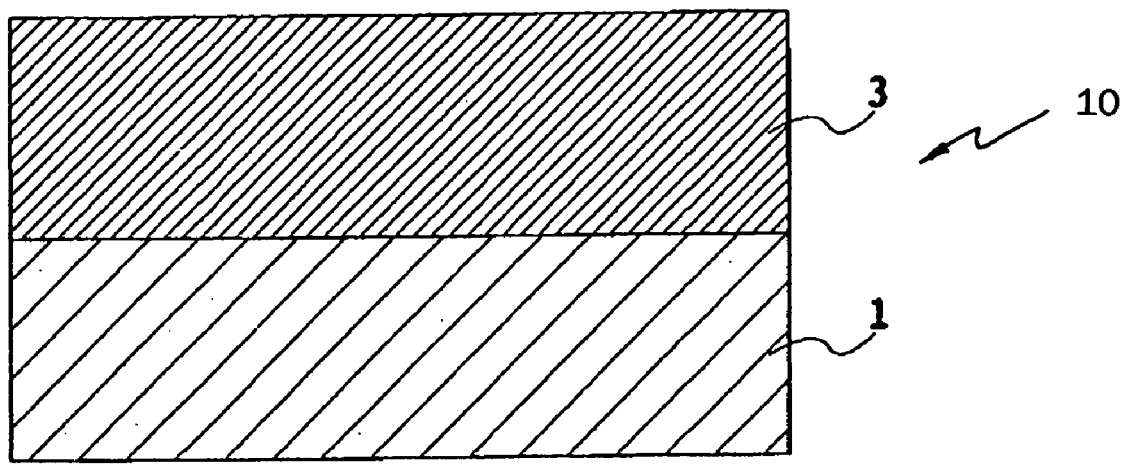
FIG. 1 schematically illustrates a cross section of a substrate according to one embodiment of a perpendicular magnetic recording medium of the present invention, in which a soft magnetic underlayer is formed on a nonmagnetic base of an aluminum alloy.
Figure 2:
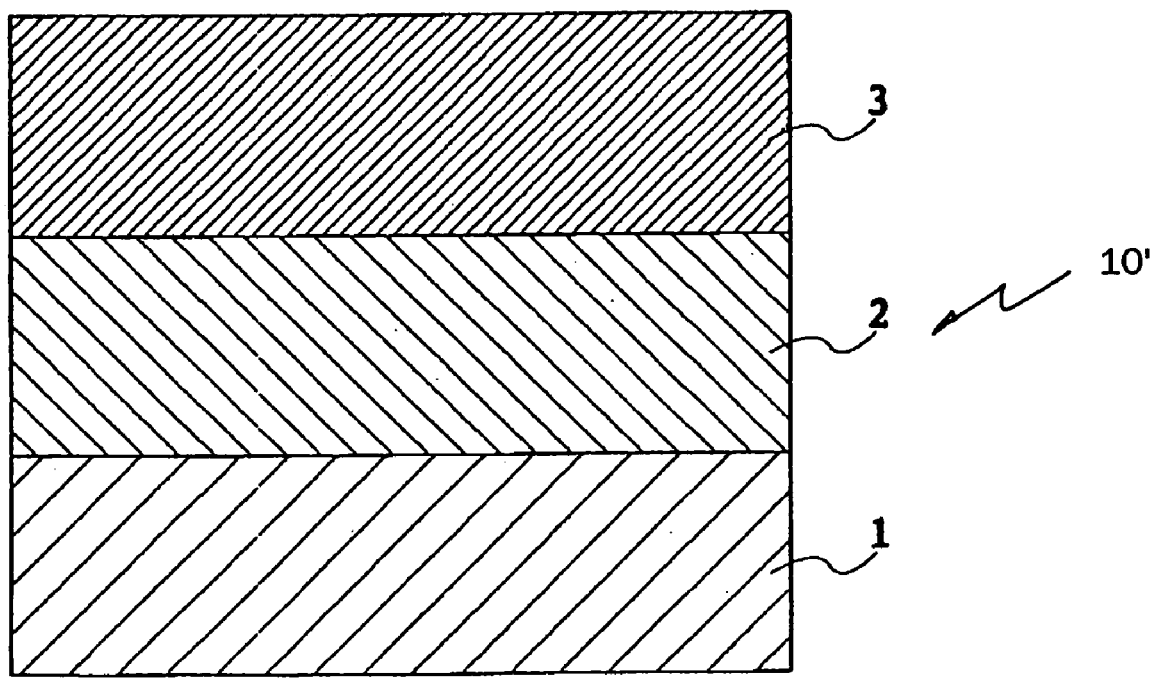
FIG. 2 schematically illustrates a cross section of a substrate according to another embodiment of a perpendicular magnetic recording medium according to the present invention, in which a nonmagnetic underlayer and a soft magnetic underlayer are formed on a nonmagnetic base of an aluminum alloy.

FIG. 1, which schematically illustrates a cross section of a substrate 10 according to the present invention for a perpendicular magnetic recording medium, in which a soft magnetic underlayer 3 is formed on an aluminum alloy base 1. FIG. 2 schematically illustrates a cross section a substrate 10' according to the present invention for a perpendicular magnetic recording medium, in which a nonmagnetic underlayer 2 and a soft magnetic underlayer 3 are formed on an aluminum alloy base 1.

Referring to FIG. 1, the nonmagnetic base 1 can be made of Al—Mg alloy or the like material that is used in a substrate of a conventional hard disk. Heating a nonmagnetic base of aluminum alloy that is commonly used at present to a high temperature, higher than 300° C. can deforms the base significantly. The present invention does not require heating or can be achieved with a heat treatment at a temperature of 300° C. or lower. Accordingly, the present invention can use a conventional aluminum alloy base 1. The shape of the nonmagnetic base 1 is typically a disk shape, though not limited to special forms.

Still referring to FIG. 1, the soft magnetic underlayer 3 can be formed of a Ni—P alloy on the nonmagnetic base 1 by an electroless plating method. The soft magnetic underlayer 3 is composed of a Ni—P alloy containing phosphorus in the range of 0.5 wt % to 6 wt %. If the content of phosphorus is less than 0.5 wt %, a stable electroless plating film is hardly formed; if the phosphorus content is larger than 6 wt %, the soft magnetic underlayer 3 does not function as a double layer soft magnetic underlayer of a perpendicular magnetic recording medium due to inadequately low value of the saturation magnetic flux density. The thickness of the soft magnetic underlayer 3 is 3 μm or greater to ensure hardness of the substrate surface. Although there is no special upper limit, the film thickness of the underlayer 3 is maintained 7 μm or less, particularly from a viewpoint of manufacturing cost. Accordingly, the preferable range of the thickness of the underlayer 3 is 3 μm to 7 μm.

Referring to FIG. 2, the nonmagnetic underlayer 2 and the soft magnetic underlayer 3 are sequentially laminated on the nonmagnetic base 1. The materials and the compositions for the nonmagnetic substrate 1 and the soft magnetic underlayer 3 are the same as in the substrate of FIG. 1. The nonmagnetic underlayer 2 is formed of an Ni—P alloy by an electroless plating method. The Ni—P alloy can contain about 11 wt % of phosphorus, which is the amount used in a substrate of a conventional hard disk.

Still referring to FIG. 2, the thickness of each underlayer can be as follows. The thickness of the nonmagnetic underlayer 2 is preferably 0.5 μm or greater to ensure adhesion between the nonmagnetic base 1 and the soft magnetic underlayer 3. The thickness of the soft magnetic underlayer 3 of 0.3 μm or greater is necessary to function as a soft magnetic backing layer of a perpendicular magnetic recording medium. Although the upper limits of the thicknesses of the soft magnetic underlayer 3 and the nonmagnetic underlayer 2 are not limiting, both thicknesses are preferably 7 μm or less from the viewpoint of manufacturing cost. In addition, the sum of the thicknesses of the nonmagnetic underlayer 2 and the soft magnetic underlayer 3 needs to be at least 3 μm to ensure hardness of the substrate surface. Again, although the upper limit of the sum of the thicknesses is not limiting, it is preferably maintained 10 μm or below from the viewpoint of manufacturing cost.

The above-described nonmagnetic or soft magnetic plating film mainly composed of Ni—P can be formed by so-called Kanigen plating process using sodium hypophosphite for a reducing agent, as is known in the art, while controlling the composition, temperature, and pH value of the plating bath.

To employ the substrate having the structure described above with respect to FIGS. 1 and 2, for a nonmagnetic substrate, the surface roughness Ra of the soft magnetic underlayer 3 is maintained 0.5 nm or less and the micro waviness Wa of the surface of the soft magnetic underlayer is maintained 0.5 nm or less to attain flying height of the magnetic head, which reads and writes information, at around 10 nm or lower. Here, the surface roughness Ra represents the center line surface roughness of a three dimensional image obtained by measuring the surface configuration in an area of 5 μm square using an atomic force microscope (AFM). The micro waviness Wa represents the waviness in an area of 1 mm square measured through a band path band path filter for a wavelength range of 50 μm to 500 μm using an optical surface configuration measuring instrument manufactured by Zygo Corporation.

To obtain such a surface configuration, the surface of the soft magnetic underlayer has to be polished smooth with free abrasive grains. The polishing can be performed by applying almost the same technique as for the conventional nonmagnetic Ni—P layers, as described earlier. The polishing can be conducted, for example, using a double sided polishing machine with polishing pads of urethane foam feeding abrasive of suspension of alumina or colloidal silica.

The substrate for a perpendicular magnetic recording medium thus formed according to the present invention exhibits a function of a soft magnetic backing layer even when it is not heat treated. However, heat treating the substrate, after forming the soft magnetic underlayer, at a temperature 300° C. or lower for 30 minutes or longer is effective to increase the saturation magnetic flux density of the soft magnetic underlayer. Heat treating the same at a temperature over 300° C. is not desirable since it increases the surface roughness of the soft magnetic underlayer. For proper increase of the saturation magnetic flux density, the preferable heat treatment temperature ranges 200° C. to 300° C.

Figure 3:
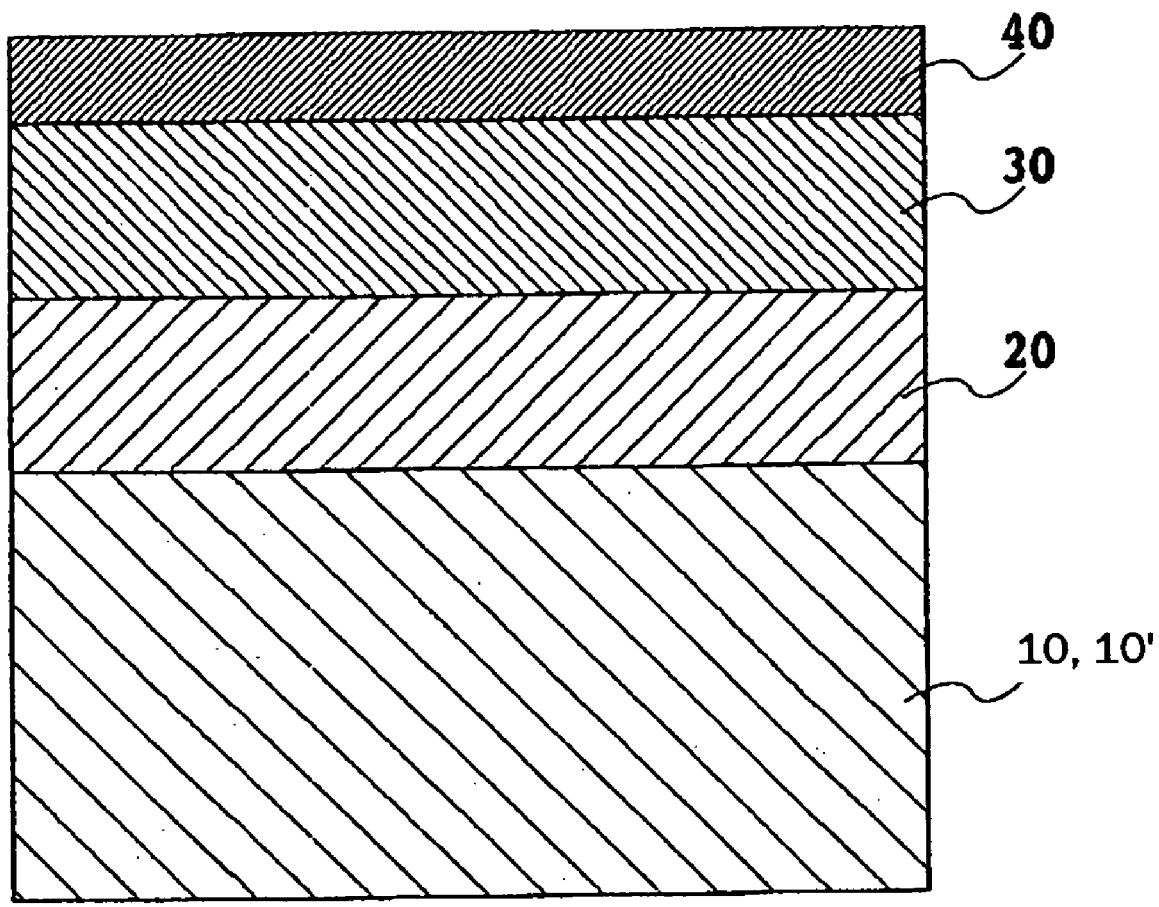
FIG. 3 schematically illustrates a cross section of a perpendicular magnetic recording medium according to the present invention.
Figure 4:
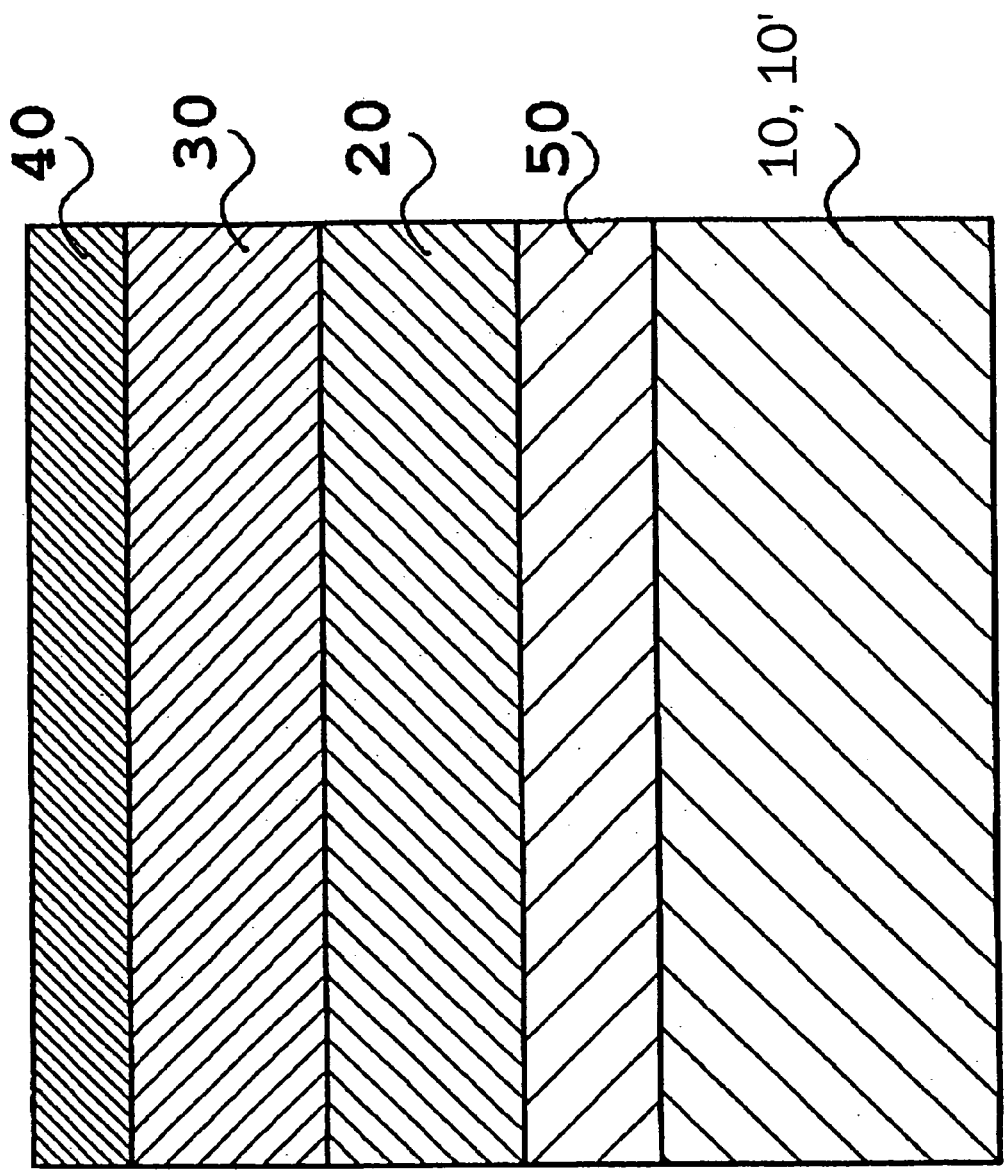
FIG. 4 schematically illustrates a cross section of a perpendicular magnetic recording medium having a soft magnetic supplement layer according to the present invention.

FIGS. 3 and 4 schematically illustrate cross section of perpendicular magnetic recording media according to the present invention. The perpendicular magnetic recording medium shown in FIG. 3 has a nonmagnetic seed layer 20, a magnetic recording layer 30, and a protective layer 40 sequentially formed on a substrate 10, 10' of FIG. 1 or FIG. 2.

For the nonmagnetic seed layer 20, a material for favorably controlling crystal alignment and grain size of the magnetic recording layer 30 can be used without special limitation. When the magnetic recording layer 30 is a perpendicular magnetic film composed of a Co—Cr alloy, the materials that can be used for the nonmagnetic seed layer 20 include a Co—Cr alloy, titanium, a titanium alloy, and ruthenium. When the magnetic recording layer 30 is a so-called multilayered perpendicular magnetic film in which a cobalt alloy and platinum or a cobalt alloy and palladium are laminated, platinum or palladium can be used for the nonmagnetic seed layer 20. A pre-seed layer or an intermediate layer optionally provided on or below the nonmagnetic seed layer 20 does not interfere with the favorable effects of the present invention.

For the magnetic recording layer 30, any material that can carry out recording and reproduction in a perpendicular magnetic recording medium can be used. The usable material includes a Co—Cr alloy and so-called multilayered perpendicular magnetic film that is a lamination of cobalt alloy and platinum, or cobalt alloy and palladium, for example.

The protective layer 40 can be a thin film composed mainly of carbon. A liquid lubricant layer of perfluoropolyether, for example, can be applied on the protective layer 40.

The nonmagnetic seed layer 20, a magnetic recording layer 30, and a protective layer 40 can be formed by any thin film forming method including sputtering, CVD, vacuum deposition, and plating.

The perpendicular magnetic recording medium formed as described above exhibits favorable recording performance as a double layer perpendicular magnetic recording medium because the soft magnetic underlayer 3 on the substrate 10 functions as a soft magnetic backing layer. In addition, as the soft magnetic underlayer is formed by an electroless plating method suited for mass production, there is no need to employ a sputtering method, for example, to form the soft magnetic underlayer. Consequently, the perpendicular magnetic recording medium according to the invention can be produced at a lower cost.

The magnetic recording medium shown in FIG. 4 comprises a substrate 10, 10' according to the present invention, and the layers sequentially formed on the substrate including a soft magnetic supplement layer 50, a nonmagnetic seed layer 20, a magnetic recording layer 30, and a protective layer 40.

Still referring to FIG. 4, the nonmagnetic seed layer 20, the magnetic recording layer 30, and the protective layer 40 can be appropriately formed of the similar materials to those in the perpendicular magnetic recording medium shown in FIG. 3. The soft magnetic supplement layer 50 has preferably a film thickness of 50 nm or less and a product of the film thickness and the saturation magnetic flux density of 150 G μm or greater. For example, the supplement layer 50 can be composed of a CoZrNb amorphous soft magnetic layer ranging 15 to 50 nm thick, exhibiting a saturation magnetic flux density of 10,000 G, or an FeTaC soft magnetic layer ranging 10 to 50 nm thick with a saturation magnetic flux density of 15,000 G. When the soft magnetic supplement layer 50 is provided, both the supplement layer and the soft magnetic underlayer work as a soft magnetic backing layer to enhance the performance as a double layer perpendicular magnetic recording medium. Besides, an effect is produced to reduce the random noise generated in the soft magnetic underlayer. The soft magnetic supplement layer preferably has a product of the film thickness and the saturation magnetic flux density of 150 G μm or larger to enhance performance as a soft magnetic backing layer. A film thickness thicker than 50 nm is apt to form a magnetic domain wall in the soft magnetic supplement layer and is not desirable because of generation of spike noises and deterioration in productivity.

The surface of the soft magnetic underlayer of the substrate can be processed by texturing with free abrasive grains, and then the above-described layers can be sequentially formed by sputtering. This procedure is favorable because minute defects like random scratches that are generated in the polishing process and unavoidably remaining on the surface of the soft magnetic underlayer can be eliminated.

Some specific examples of embodiments according to the present invention will be described below.

In Example 1, the nonmagnetic base is composed of an Al—Mg alloy having a diameter of 3.5 inches. After washing the surface by alkali cleaning and acid etching, zincate (substituted zinc plating) was executed as an initial reaction layer for electroless Ni—P plating. Then, soft magnetic underlayers of a Ni—P alloy having various thicknesses ranging 0.5 μm to 10 μm were formed using the plating bath shown below. The average phosphorus concentration in the thus formed soft magnetic underlayer was 4 wt %.

Plating Bath (1):

| | |
|---|---|
| Nickel sulfate | 25 g/liter |
| Sodium hypophosphite | 15 g/liter |
| Sodium acetate | 10 g/liter |
| Sodium citrate | 15 g/liter |
| pH | 6 ± 0.1 (adjusted by NaOH and $H_2SO_4$) |
| Bath temperature | 90 ± 1° C. |

The surface of the soft magnetic underlayer was polished using colloidal silica with average particle diameter of 30 nm and polishing pads of urethane foam to obtain a surface roughness Ra of 0.3 nm and a micro waviness Wa of 0.2 nm. Thus, substrates 10 of FIG. 1 for perpendicular magnetic recording media were produced. Abrasion quantity removed by the polishing was about 0.2 μm in a measure converted to the film thickness.

After cleaning, each of the substrates 10 was introduced into a sputtering apparatus, and heated to a substrate surface temperature of 250° C. for 10 seconds by a lamp heater. A titanium seed layer 10 nm thick was deposited using a titanium target. Subsequently a magnetic recording layer of a CoCrPt alloy 30 nm thick was deposited using a target of $Co_{70}Cr_{20}Pt_{10}$. Then, a carbon protective layer 8 nm thick was deposited using a carbon target, and the laminated substrate was taken out from the vacuum chamber. These sputtering processes were all conducted by a DC magnetron sputtering method under an argon gas pressure of 5 mTorr. Finally, forming a liquid lubricant layer of perfluoropolyether 2 nm thick by dip-coating, perpendicular magnetic recording media as shown in FIG. 3 were produced.

After polishing and cleaning of the substrates in Example 1, heating of the substrates was carried out in the sputtering apparatus for controlling properties of the magnetic recording layer, as described above. This heat treatment, however, being executed in a short time and at a relatively low temperature of 250° C., scarcely caused any structural change of the soft magnetic underlayer. Thus, the surface roughness and waviness of the produced perpendicular magnetic recording medium were approximately equivalent to those of the initial substrates formed.

Each of the thus produced perpendicular magnetic recording media was incorporated, together with a single pole type magnetic head, into a hard disk drive. After giving mechanical shock of 50 G for 1 ms to the hard disk drive, the surface of the perpendicular magnetic recording medium was observed by an optical microscope to inspect for occurrence of flaws. Table 1 shows occurrence of flaws on the medium in relation with the thickness of the soft magnetic underlayer. As Table 1 shows, the flaws were detected on the surface of a medium having a soft magnetic underlayer thinner than 3 μm, while no flaw was detected on the surface of a medium having a soft magnetic underlayer thicker than or equal to 3 μm.

TABLE 1

| THICKNESS OF SOFT MAGNETIC UNDERLAYER (μm) | FLAWS |
|---|---|
| 0.5 | X |
| 1.5 | X |
| 2.7 | Δ |
| 3.1 | ○ |
| 4.0 | ○ |
| 7.0 | ○ |
| 10.0 | ○ |

X: Flaws detected
Δ: Microscopic flaws detected
○: No flaw detected

In Example 2, the nonmagnetic base was also composed of an Al—Mg alloy having a diameter of 3.5 inches. After washing the surface by alkali cleaning and acid etching, zincate (substituted zinc plating) was executed as an initial reaction layer for electroless Ni—P plating. Then, nonmagnetic underlayers of a Ni—P alloy having various thicknesses ranging 0.5 μm to 10 μm were formed on the nonmagnetic bases using a plating bath, including commercially available electroless Ni—P plating liquid for a hard disk substrate (NIMUDEN HDX manufactured by C. Uyemura & Co., Ltd.), the bath being regulated at a nickel concentration of 6.0±0.1 g/L, a pH value of 4.5±0.1, and a bath temperature of 92±1° C. The average phosphorus concentration in the nonmagnetic Ni—P plating film was 12 wt %.

Subsequently, soft magnetic underlayers having various thicknesses from 0 to 10 μm were formed of Ni—P alloy with average phosphorus concentration of 4 wt % in the same manner as in Example 1. Substrates 10' as shown in FIG. 2 for perpendicular magnetic recording media were produced as in Example 1. Further, perpendicular magnetic recording media as shown in FIG. 3 were produced as in Example 1.

Table 2 shows the occurrence of flaws on the medium in relation with the thicknesses of the nonmagnetic underlayer and the soft magnetic underlayer evaluated by the same manner as in Example 1. The flaws were detected on the surface of a medium when the sum of the thicknesses of the nonmagnetic underlayer and the soft magnetic underlayer was thinner than 3 μm, while the flaws on the medium surface was not detected when the sum of the thicknesses was 3 μm or thicker.

TABLE 2

| THICKNESS OF SOFT MAGNETIC UNDERLAYER (μm) | THICKNESS OF NONMAGNETIC UNDERLAYER (μm) | SUM OF THE THICKNESSES | FLAWS |
|---|---|---|---|
| 0.0 | 5.0 | 5.0 | ○ |
| 0.5 | 1.0 | 1.5 | X |
| 0.5 | 3.0 | 3.5 | ○ |
| 1.5 | 0.5 | 2.0 | X |
| 1.5 | 1.2 | 2.7 | Δ |
| 1.5 | 1.8 | 3.3 | ○ |
| 2.7 | 1.0 | 3.7 | ○ |
| 3.1 | 0.5 | 3.6 | ○ |

X: Flaws detected
Δ: Microscopic flaws detected
○: No flaw detected

Figure 5:
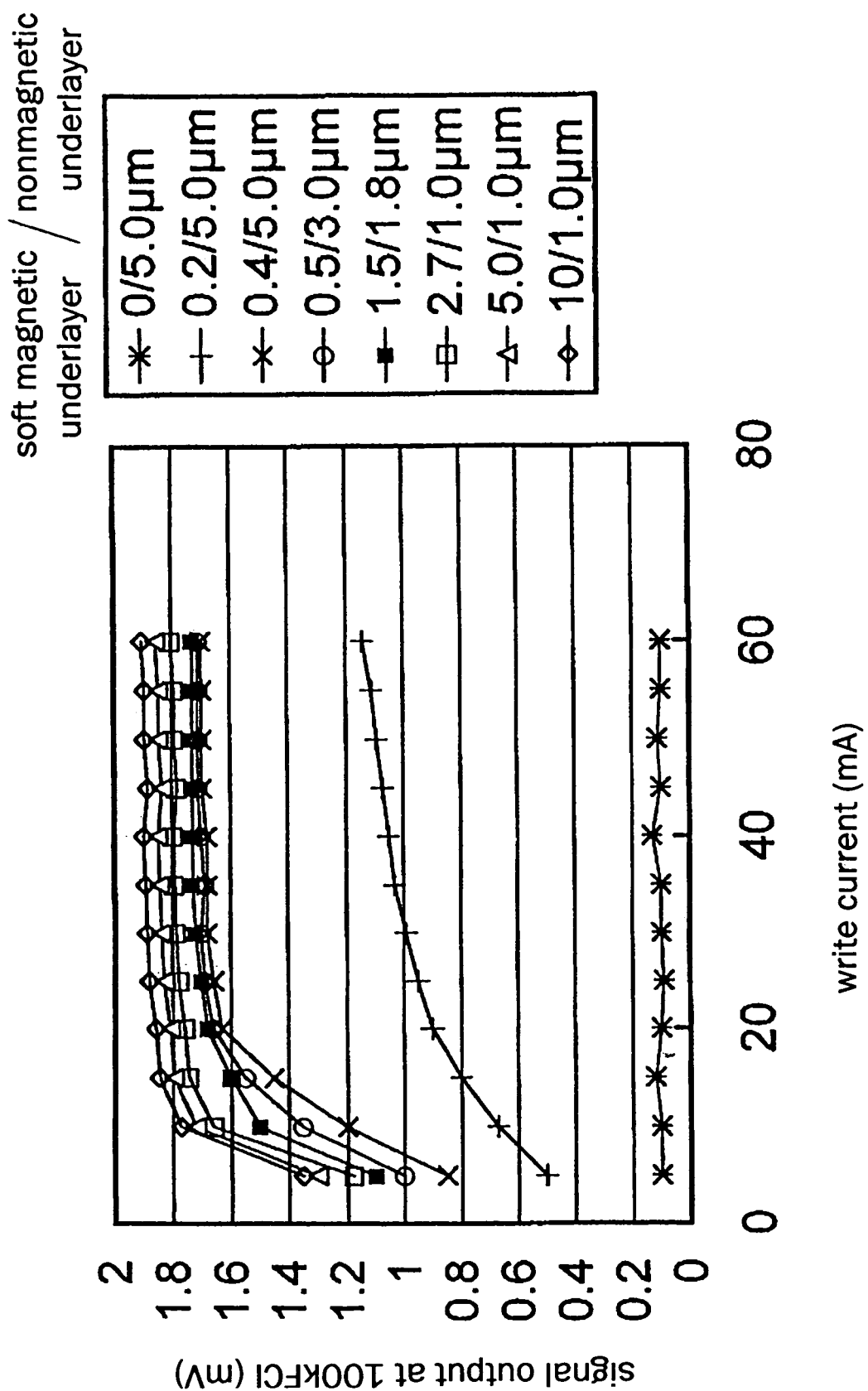
FIG. 5 illustrates signal output at a recording density of 100 kFCI of perpendicular magnetic recording media having various thicknesses of the soft magnetic underlayer as functions of write current of a magnetic head.

Recording performance was measured on these perpendicular magnetic recording media using a single pole type magnetic head for a perpendicular magnetic recording medium employing spinning stand tester. FIG. 5 shows signal output at a recording density of 100 kFCI (flux change per inch) as functions of write current of a magnetic head. When the thickness of the soft magnetic underlayer was zero, that is, without a soft magnetic underlayer, practically no signal output was obtained. When the thickness of the soft magnetic underlayer was thinner than 0.3 μm, signal output was relatively low and the signal output did not saturate with increase of the write current. When the saturation of the signal output is slow with increase in the write current as in these cases, large current is necessary for generating a larger output. Further, in the region of unsaturated signal output, the signal output greatly changes with variation of the write current, which is unfavorable for practical application. On the other hand, when the thickness of the soft magnetic underlayer was 0.3 μm or thicker, sufficient signal output was gained. Moreover, the signal output saturated at a low current value. Thus, such media are practically useful. When the media having the same thickness of the soft magnetic underlayer exhibited the equivalent dependence of the signal output on the write current, despite different thickness of the nonmagnetic underlayers.

In Example 3, substrates as shown in FIG. 2 for a perpendicular magnetic recording medium were produced in the same manner as in Example 2 except that the nonmagnetic underlayer was 1.0 μm thick, the soft magnetic underlayer was 2.7 μm thick, and the average phosphorus concentration in the soft magnetic underlayer was varied in a range of 0.3 wt % to 9 wt % by varying the conditions of the plating bath in such a range as shown below. When the phosphorus concentration was 0.3 wt %, the plating bath was found very unstable and unsuited for mass production. Perpendicular magnetic recording media were also produced in the same manner as in Example 1.

Plating Bath (2):

| | |
|---|---|
| Nickel sulfate | 10-35 g/liter |
| Sodium hypophosphite | 10-30 g/liter |
| Sodium acetate | 10 g/liter |
| Sodium citrate | 15 g/liter |
| pH | 5.0-6.5 (adjusted by NaOH and $H_2SO_4$) |
| Bath temperature | 75-95° C. |

Figure 6:
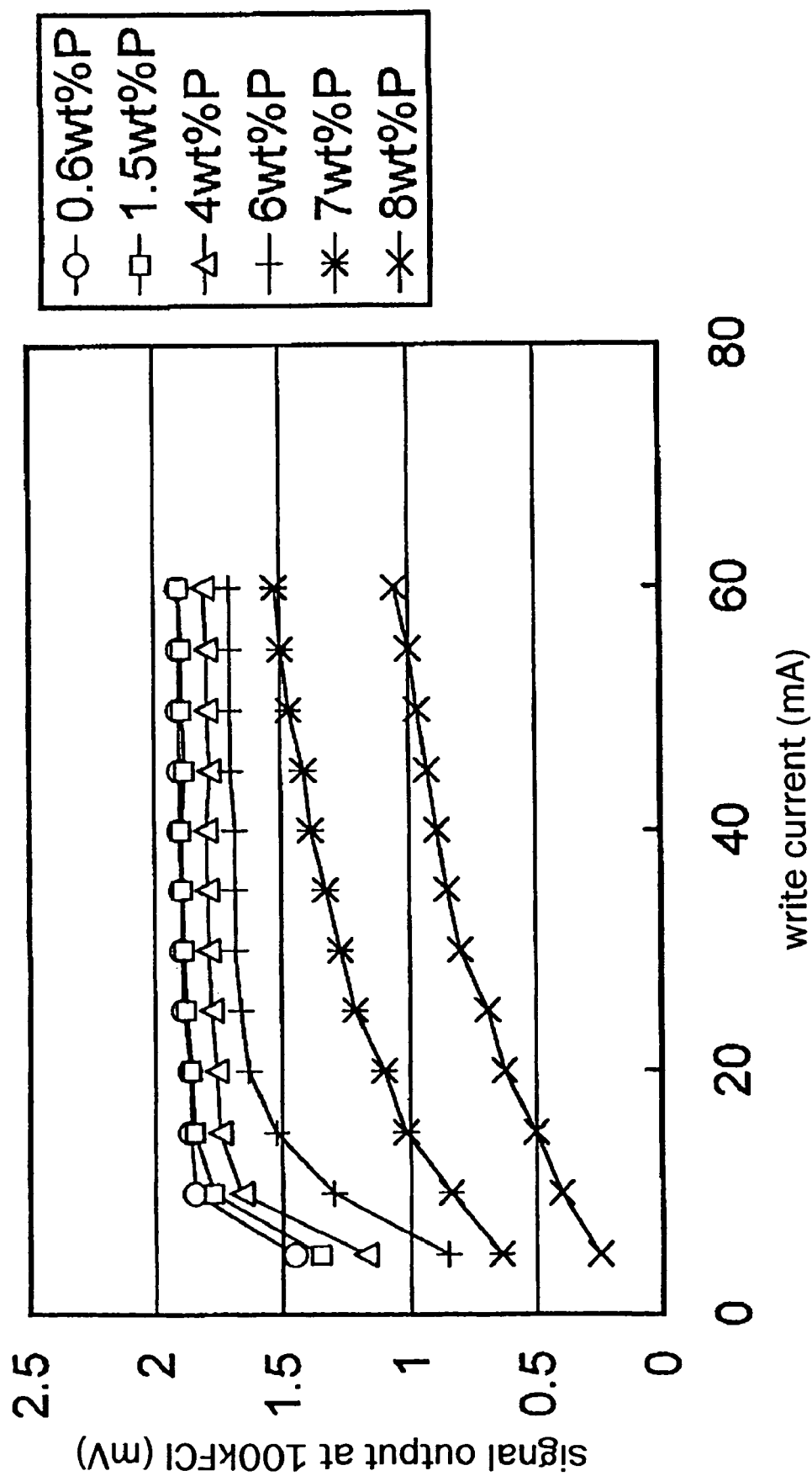
FIG. 6 illustrates signal output at a recording density of 100 kFCI of perpendicular magnetic recording media having various average phosphorus concentration in the soft magnetic underlayer as functions of write current in the magnetic head.

Measurements of the recording performance were made on the produced media in the same manner as in Example 2. FIG. 6 shows signal output at a recording density of 100 kFCI as functions of write current in the magnetic head. When the average phosphorus concentration in the soft magnetic underlayer is 6 wt % or less, sufficient signal output was obtained. At 7 wt %, the signal output decreased and saturation of the output became slow. Thus, the function is inadequate for a soft magnetic backing layer.

In Example 4, substrates as shown in FIG. 2 for a perpendicular magnetic recording medium were produced in the same manner as in Example 2 except that the average phosphorus concentration in the soft magnetic underlayer was 4 wt %, the nonmagnetic underlayer was 1.0 μm thick, the soft magnetic underlayer was 2.7 μm thick, and the heat treatment was conducted after formation of the soft magnetic underlayer at a temperature in a range of 100° C. to 350° C. and for a time interval in a range of 20 minutes to 60 minutes.

Figure 7:
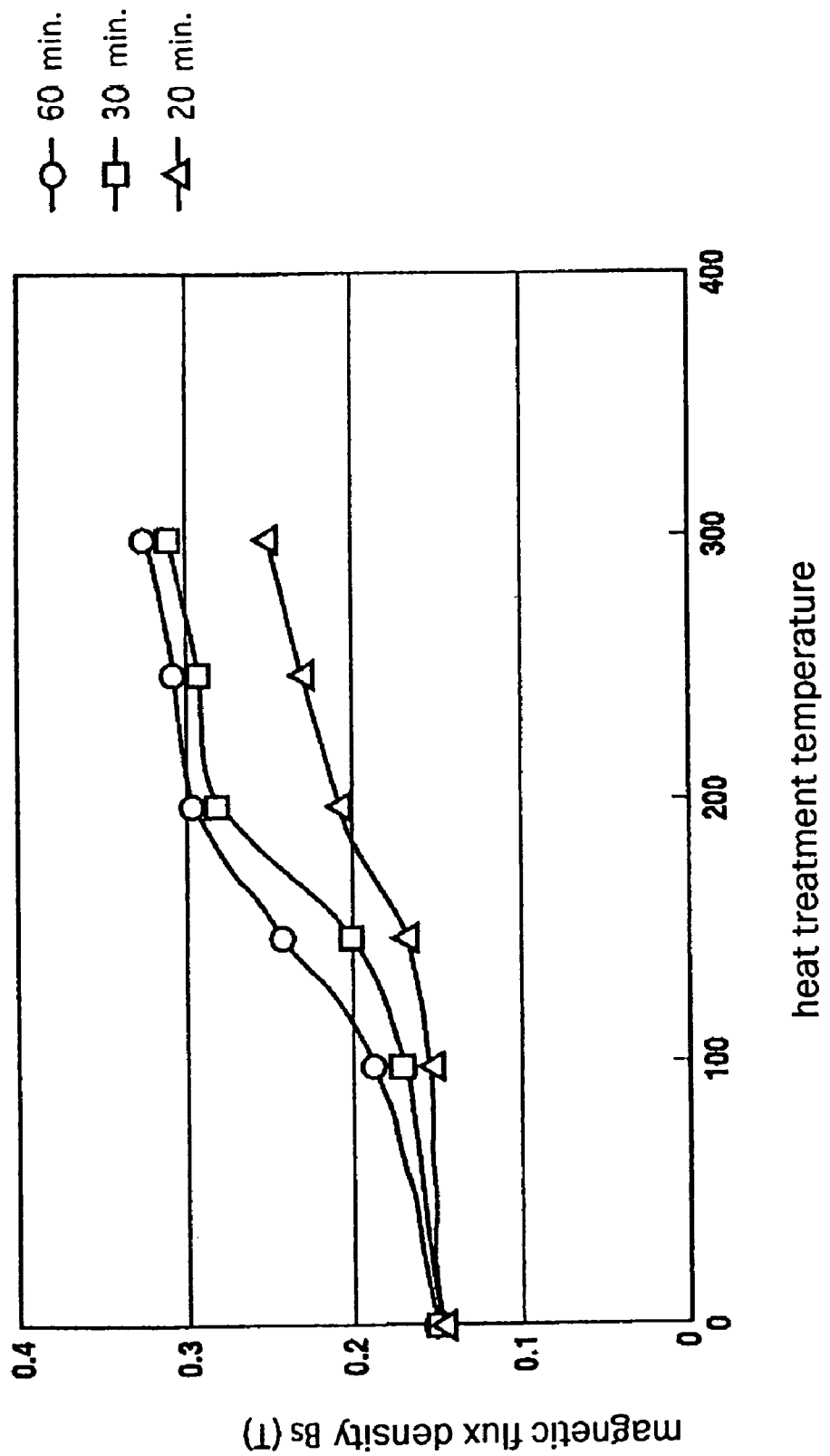
FIG. 7 illustrates the magnetic flux density Bs of the pieces of the substrate for a perpendicular magnetic recording medium produced with various time interval of heat treatment, as functions of the heat treatment temperature.

A piece of sample of 8 mm square was cut from each of the thus produced substrates at the radial position of about 30 mm. The saturation magnetic flux density of each sample was measured using a vibrating sample magnetometer VSM with the maximum applying field of 10 kOe. FIG. 7 shows the saturation magnetic flux density Bs of the pieces of samples of the substrate for a perpendicular magnetic recording medium produced with various time interval of heat treatment, as functions of the heat treatment temperature. As is apparent from the figure, the heat treatment increases the saturation magnetic flux density of the soft magnetic underlayer from the saturation magnetic flux density of about 0.15 T of the unheated samples. The saturation magnetic flux density was increased to about 0.3 T by heat treatment at a temperature from 200° C. to 300° C. for 30 minutes or longer. It has been also shown that heating for more than 30 minutes does not further increase the saturation magnetic flux density in this temperature range, and the heating time of 30 minutes has been found sufficient for the Bs enhancement. In the case of the heat treatment at 350° C., the nonmagnetic underlayer was magnetized; consequently, the accurate Bs measurement of the soft magnetic underlayer was impossible.

In Example 5, substrates as shown in FIG. 2 for a perpendicular magnetic recording medium were produced in the same manner as in Example 2 except that the average phosphorus concentration in the soft magnetic underlayer was 4 wt %, the nonmagnetic underlayer was 1.0 µm thick, the soft magnetic underlayer was 2.7 µm thick, and the heat treatment was conducted after formation of the soft magnetic underlayer at a temperature in a range of 100° C. and 350° C. for 60 minutes. Perpendicular magnetic recording media as shown in FIG. 3 were further produced in the same manner as in Example 1.

Figure 8:
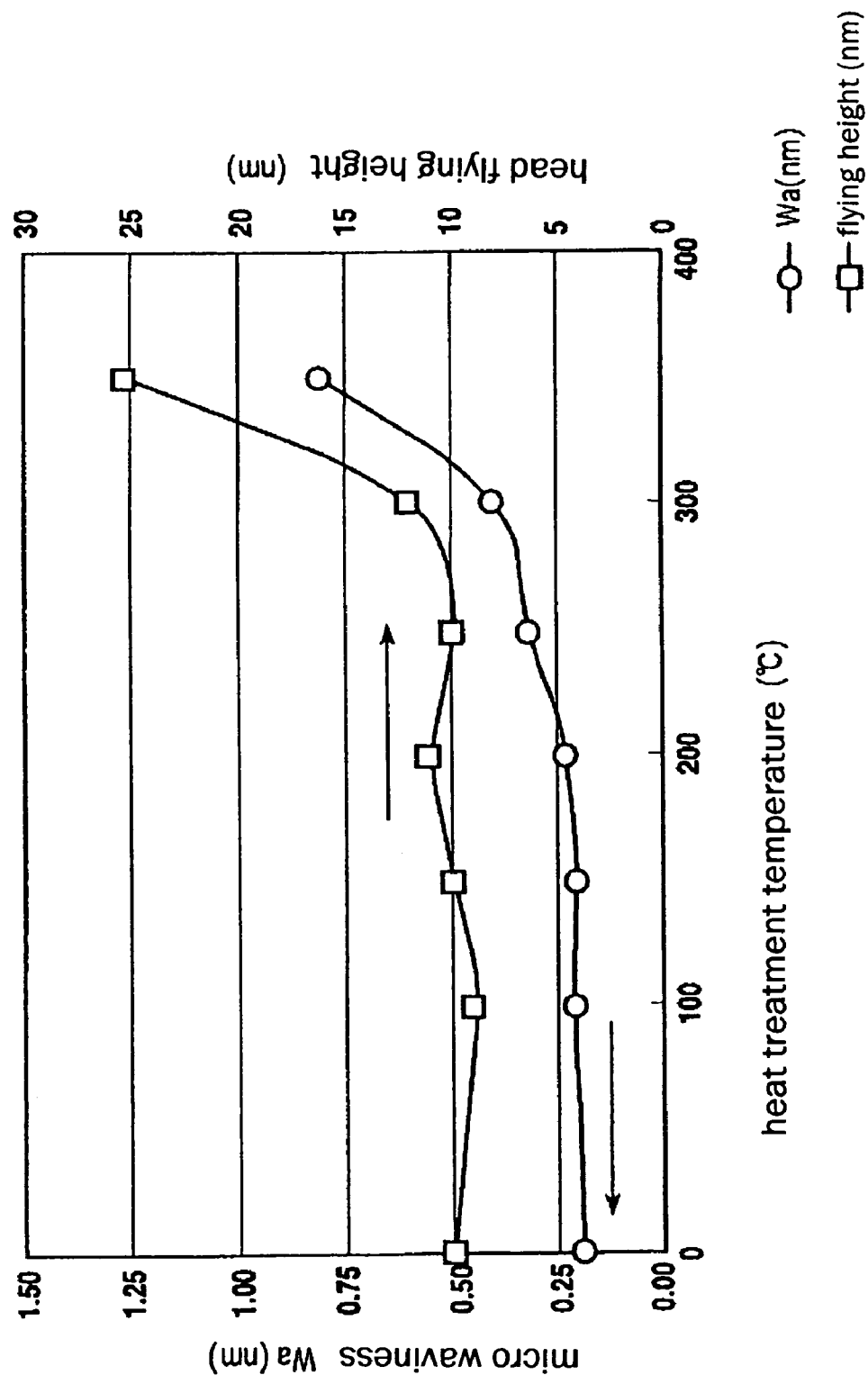
FIG. 8 illustrates the micro waviness Wa of the surface of a perpendicular magnetic recording medium and the minimum flying height of the magnetic head over the medium as functions of the temperature of the heat treatment.

The micro waviness Wa of the surface of each medium was measured in an area of 1 mm square through a band path filter for a wavelength range of 50 µm to 500 µm using an optical surface configuration measuring instrument manufactured by Zygo Corporation. In addition, the minimum flying height of the magnetic head over the medium was measured in the following way. A medium is rotated in a spinning stand while a magnetic head carrying a piezoelectric element flies over the medium. A relationship between the rotating speed of the medium and the head flying height has been obtained previously. The rotating speed is gradually decreased until the voltage of the piezoelectric element abruptly increases at a certain rotating speed. This rotating speed is converted to the head flying height to obtain the minimum head flying height. FIG. 8 shows the micro waviness Wa and the minimum flying height of the magnetic head as functions of the temperature of heating the soft magnetic underlayer. The micro waviness Wa is nearly constantly about 0.2 nm up to about 200° C.; heating to 300° C. increased the Wa value to about 0.4 nm; heating at 350° C. sharply increased the micro waviness Wa to 0.8 nm. The head flying height is kept at a low value of about 10 nm at a heating temperature up to 300° C. At 350° C., the flying height suddenly deteriorates. Thus, the heat treatment temperature has been found to be effective when kept 300° C. or less to retain the low flying height of the head without increase of the micro waviness Wa.

In Example 6, a substrate for a perpendicular magnetic recording medium as shown in FIG. 2 was produced in the same manner as in Example 2 except that the nonmagnetic underlayer was 1.0 µm thick, the soft magnetic underlayer was 2.7 µm thick, and a heat treatment at 250° C. for 60 minutes was conducted after formation of the soft magnetic underlayer. After cleaning, the substrate was introduced into a sputtering apparatus, in which a soft magnetic supplement layer of a NiFe alloy having a film thickness in a range of 0 to 100 nm was formed using a target of $Ni_{80}Fe_{20}$. Subsequently, substrate heating and the followed processes were executed in the same manner as in Example 1, to produce a perpendicular magnetic recording medium as shown in FIG. 4. The thus formed soft magnetic supplement layer exhibited saturation magnetic flux density of 10,000 G.

Figure 9:
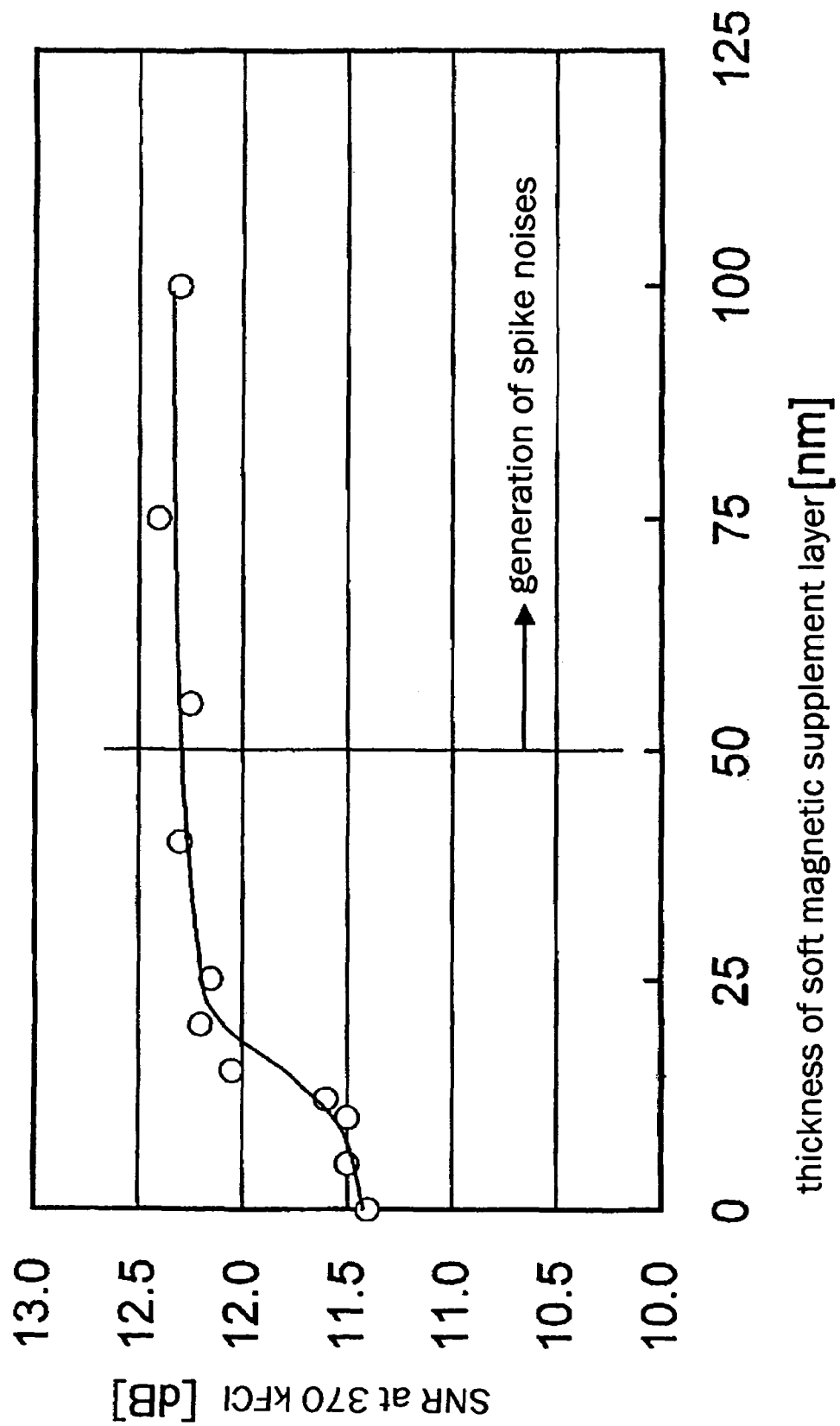
FIG. 9 illustrates the signal-to-noise ratio (SNR) at a recording density of 370 kFCI (flux change per inch) in relation with the thickness of the soft magnetic supplement layer.

Recording performance was measured on these perpendicular magnetic recording media employing a single pole type magnetic head for a perpendicular magnetic recording medium using a spinning stand tester. FIG. 9 shows signal-to-noise ratio SNR at a recording density of 370 kFCI (flux change per inch) as functions of thickness of the soft magnetic supplement layer.

The SNR values are inferior when the thickness of the soft magnetic supplement layer is thinner than 15 nm, that is, the product of the thickness and the saturation magnetic flux density is less than 150 G µm. By forming a soft magnetic supplement layer having a thickness of 15 nm or larger, the SNR has improved by 0.5 dB to 1 dB as compared with the case without a soft magnetic supplement layer. The SNR is nearly constant in the region of thickness of 15 nm or larger. Media having a soft magnetic supplement layer with a thickness of 50 nm or larger, however, generated spike noises that can be assumed originated in the soft magnetic supplement layer. Consequently, such media were improper for perpendicular magnetic recording media.

Figure 10:
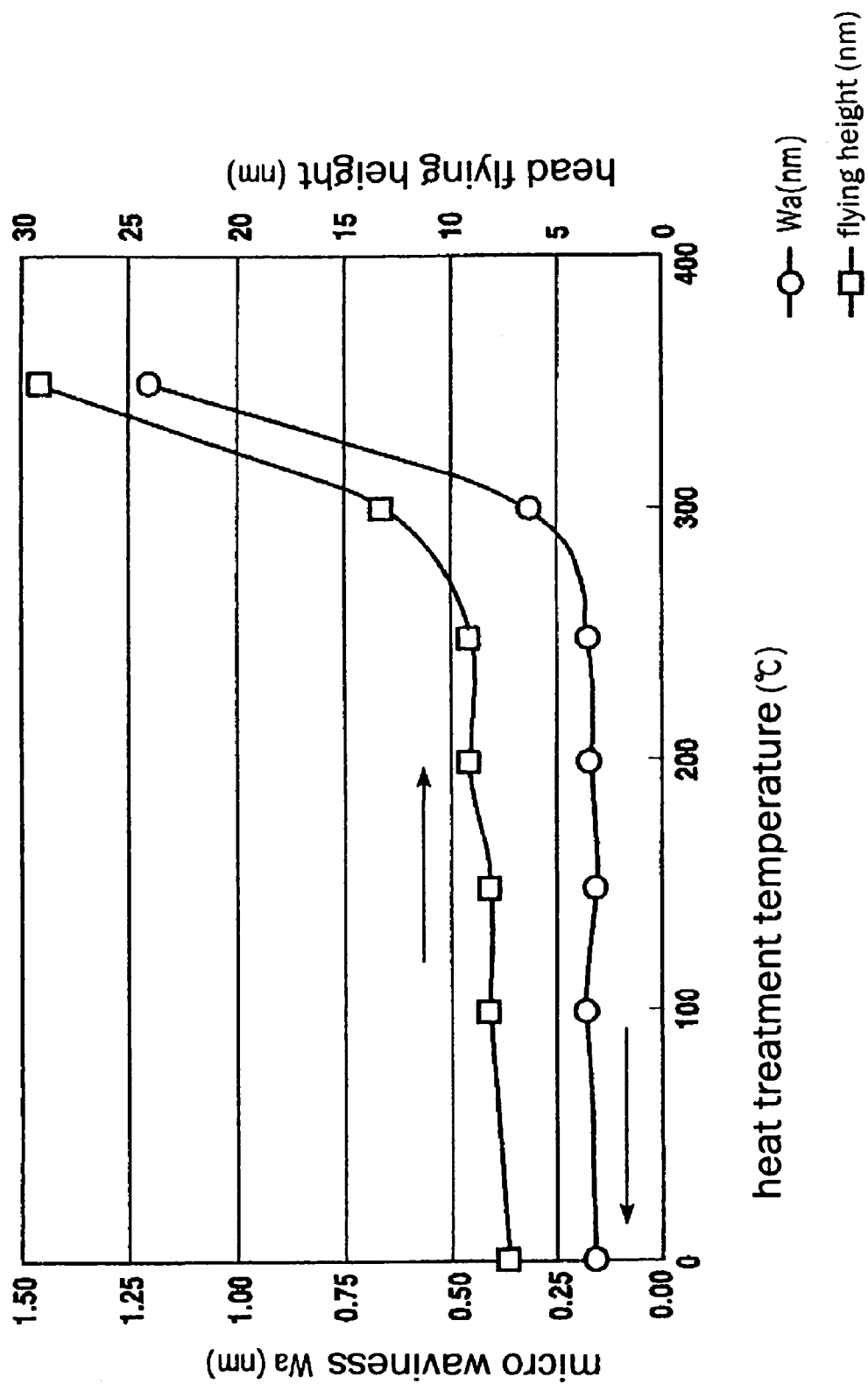
FIG. 10 illustrates the micro waviness Wa of the surface of a perpendicular magnetic recording medium produced on a nonmagnetic Ni—P substrate and the minimum flying height of the magnetic head over the medium as functions of the temperature of the heat treatment.

As a Comparative Example, a conventional hard disk substrate comprising an aluminum alloy base and a nonmagnetic Ni—P underlayer on the base was used for a substrate for a magnetic recording medium. The substrate was heated at a temperature in the range of 100° C. and 350° C. for 60 minutes and then cleaned. As in the Example 1, the substrate was heated at 250° C. for 10 seconds by a lamp heater and then deposition processes were conducted for a titanium seed layer 10 nm thick, a CoCrPt alloy magnetic recording layer 30 nm thick, and a carbon protective layer 8 nm thick. The deposited substrate was taken out from the vacuum chamber. A liquid lubricant layer 2 nm thick was formed of perfluoropolyether by a dip-coating method, to obtain a perpendicular magnetic recording medium. Measurements of the micro waviness Wa of the medium surface and the minimum flying height of the magnetic head were made on the produced media in the same manner as in Example 5. FIG. 10 shows the micro waviness Wa and the minimum flying height of the magnetic head as functions of the temperature of heating the hard disk substrate. Heating temperatures lower than or equal to 250° C. resulted in the micro waviness Wa and the flying height of the small values of about 0.2 nm and lower than or equal to 10 nm, respectively. At the heating temperature of 300° C., the micro waviness Wa and the flying height increased a little. At 350° C., the micro waviness Wa abruptly increased to larger than 1 nm, and the flying height rose to about 30 nm. When the heating temperature was 300° C. or lower, the nonmagnetic Ni—P film was not adequately transformed to a soft magnetic state.

As described above, according to the present invention, a substrate for a perpendicular magnetic recording medium with mass productivity, functioning as a soft magnetic backing layer of a perpendicular magnetic recording medium, and ensuring surface hardness, can be obtained when a soft magnetic underlayer having a thickness of 3 µm or greater composed of a Ni—P alloy containing phosphorus in the range of 0.5 wt % to 6 wt % is formed on a nonmagnetic base of an aluminum alloy by means of an electroless plating method.

The same effects as described above can also be obtained, after forming a nonmagnetic underlayer mainly composed of a Ni—P alloy on a nonmagnetic base of an aluminum alloy by electroless plating, by further forming a soft magnetic underlayer of a Ni—P alloy containing phosphorus in a range of 0.5 wt % to 6 wt % on the nonmagnetic underlayer. Here, the thickness of the nonmagnetic underlayer is in the range of 0.5 μm to 7 μm, the thickness of the soft magnetic underlayer is 0.3 μm or thicker, and the sum of the thicknesses of the nonmagnetic underlayer and the soft magnetic underlayer is 3 μm or thicker.

By the intervention of the nonmagnetic underlayer between the nonmagnetic base of an aluminum alloy and the soft magnetic underlayer, adhesion between the nonmagnetic base of an aluminum alloy and the soft magnetic underlayer of a Ni—P alloy film can be made firmer. For this purpose, the thickness of the nonmagnetic underlayer is necessarily more than or equal to 0.5 μm. The thickness of the soft magnetic underlayer is 0.3 μm or greater to function as a soft magnetic backing layer of a perpendicular magnetic recording medium that allows high density recording. To guarantee hardness of the substrate surface, sum of the thicknesses of the nonmagnetic underlayer and the soft magnetic underlayer is 3 μm or greater.

Concerning a composition of the soft magnetic underlayer, a stable electroless plating film can hardly be formed with a phosphorus concentration less than 0.5 wt %; a phosphorus concentration more than 6 wt % cannot provide the function as a soft magnetic backing layer due to too low value of saturation magnetic flux density.

Thus-constructed substrate for a perpendicular magnetic recording medium is required that the surface roughness Ra of the soft magnetic underlayer is 0.5 nm or smaller and the micro waviness Wa of the surface of the soft magnetic underlayer is 0.5 nm or less, which conditions are necessary to achieve a low flying height of about 10 nm or less of a magnetic head, which performs recording of information. To achieve these surface conditions, the surface of the soft magnetic underlayer is to be polished smooth with free abrasive grains.

The soft magnetic Ni—P underlayer of the invention can exhibit satisfactory smoothness by executing nearly the same polishing process as for a conventional nonmagnetic Ni—P layer. Thus, the polishing process can take advantage of a conventional technique.

The soft magnetic Ni—P underlayer according to the present invention consists of fine crystalline grains even in an as-plated condition. Each crystalline grain has homogeneous composition, which is a solid solution of phosphorus in nickel. This composition of the soft magnetic Ni—P underlayer of the invention is substantially different from the composition of a soft magnetic Ni—P layer that is transformed from a nonmagnetic Ni—P layer by heat treatment. The transformed Ni—P layer is composed of two types of crystals: nickel and $Ni_3P$. Therefore, satisfactory smoothness can be attained by nearly the same polishing process as for a conventional nonmagnetic Ni—P layer. Thus, the polishing process can take advantage of a conventional technique.

Although a substrate for a perpendicular magnetic recording medium according to the invention as described above serves the function of a soft magnetic backing layer without the heat treatment, heat treating at a temperature of 300° C. or lower for 30 minutes or longer after forming the soft magnetic underlayer is favorable since the heat treatment increases the saturation magnetic flux density of the soft magnetic underlayer. Because the heat treatment within the above-indicated range of temperature and time does not generate of $Ni_3P$ crystals, smoothing of the soft magnetic underlayer can be performed, as in the case without the heat treatment, by a polishing process similar to the conventional process for a nonmagnetic Ni—P layer.

On the other hand, if the heat treatment is conducted at a temperature higher than 300° C., a mechanism works that is similar to the process in the heat treatment of a nonmagnetic Ni—P layer for transformation to a soft magnetic state, and such high temperature heat treatment is unfavorable because the surface roughness of a soft magnetic Ni—P layer increases and smoothing by a polishing process becomes difficult due to the generation of $Ni_3P$ crystals.

A perpendicular magnetic recording medium comprising a nonmagnetic seed layer, a magnetic recording layer, and a protective layer sequentially formed on an above-described substrate of the invention has been found by the inventors to exhibit excellent recording performance as a double layer perpendicular magnetic recording medium since a function of a soft magnetic backing layer is provided by the soft magnetic underlayer on the substrate. Because the soft magnetic underlayer is formed by an electroless plating method, which is suited to mass production, the production cost is much lower than in the case the soft magnetic underlayer has to be formed by, for example, a sputtering method.

A soft magnetic supplement layer can be added between the soft magnetic underlayer and the nonmagnetic seed layer, the supplement layer having a film thickness of 50 nm or thinner and a product of the thickness and the saturation magnetic flux density of 150 G μm or greater. Since both the soft magnetic supplement layer and the soft magnetic underlayer work as a soft magnetic backing layer, the performance as a double layer perpendicular magnetic recording medium enhances and besides, an effect is produced to reduce the random noises generated in the soft magnetic underlayer. The soft magnetic supplement layer has preferably a product of the film thickness and the saturated magnetic flux density of 150 G μm or larger in order to enhance performance as a soft magnetic backing layer. A film thickness thicker than 50 nm is apt to form a magnetic domain wall in the soft magnetic supplement layer and is unfavorable because of generation of spike noises and deterioration of productivity.

The surface of the soft magnetic underlayer of the substrate can be processed by texturing with free abrasive grains, and then the above-described layers are sequentially formed by sputtering. This procedure is favorable because minute defects like random scratches can be eliminated that are generated in the polishing process and unavoidably remaining on the surface of the soft magnetic underlayer.

As described above, according to the present invention, a substrate for a perpendicular magnetic recording medium that allows mass production, the function as a soft magnetic backing layer of a perpendicular magnetic recording medium, and the ensured surface hardness can be obtained. By using such a substrate, a perpendicular magnetic recording medium with satisfactory performances can be achieved.

Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention. The scope of the present invention accordingly is to be defined as set forth in the appended claims.

The disclosures of the priority applications, JP 2003-027486 and JP 2003-201242, in their entirety, including the drawings, claims, and the specification thereof, are incorporated herein by reference.

What is claimed is:

1. A substrate for a perpendicular magnetic recording medium, the substrate comprising:
    a nonmagnetic base composed of an aluminum alloy;
    a soft magnetic underlayer; and
    a nonmagnetic underlayer composed of an Ni—P alloy formed between the base and the soft magnetic underlayer,
    wherein the soft magnetic underlayer consists of a Ni—P alloy containing phosphorus in a range of 0.5 wt % to 6 wt %.

2. The substrate according to claim 1, wherein the soft magnetic underlayer has a thickness of 3 µm or greater.

3. The substrate according to claim 1, wherein the nonmagnetic underlayer has a thickness ranging 0.5 µm to 7 µm, the soft magnetic underlayer has a thickness of 0.3 µm or greater, and a sum of the thickness of the nonmagnetic underlayer and the thickness of the soft magnetic underlayer is 3 µm or greater.

4. The substrate according to claim 1, wherein the nonmagnetic underlayer is composed of Ni—P alloy containing about 11 wt % of phosphorus.

5. The substrate according to claim 1, wherein the surface of the soft magnetic underlayer has a surface roughness Ra of 0.5 nm or less and a micro waviness Wa of 0.5 nm or less.

6. The substrate according to claim 3, wherein the surface of the soft magnetic underlayer has a surface roughness Ra of 0.5 nm or less and a micro waviness Wa of 0.5 nm or less.

7. A perpendicular magnetic recording medium comprising:
    a substrate; and
    a nonmagnetic seed layer, a magnetic recording layer, and a protective layer sequentially formed on the substrate,
    wherein the substrate comprises a nonmagnetic base composed of an aluminum alloy, a soft magnetic underlayer, and a nonmagnetic underlayer composed of an Ni—P alloy formed between the base and the soft magnetic underlayer,
    wherein the soft magnetic underlayer consists of a Ni—P alloy containing phosphorus in a range of 0.5 wt % to 6 wt %, and
    wherein the soft magnetic underlayer functions as a soft magnetic backing layer.

8. The perpendicular magnetic recording medium according to claim 7, wherein the soft magnetic underlayer has a thickness of 3 µm or greater.

9. The perpendicular magnetic recording medium according to claim 7, wherein the nonmagnetic underlayer has a thickness ranging 0.5 µm to 7 µm, the soft magnetic underlayer has a thickness of 0.3 µm or greater, and a sum of the thickness of the nonmagnetic underlayer and the thickness of the soft magnetic underlayer is 3 µm or greater.

10. The perpendicular magnetic recording medium according to claim 7, wherein the nonmagnetic underlayer is composed of Ni—P alloy containing about 11 wt % of phosphorus.

11. The perpendicular magnetic recording medium according to claim 7, wherein the surface of the soft magnetic underlayer has a surface roughness Ra of 0.5 nm or less and a micro waviness Wa of 0.5 nm or less.

12. The perpendicular magnetic recording medium according to claim 9, wherein the surface of the soft magnetic underlayer has a surface roughness Ra of 0.5 nm or less and a micro waviness Wa of 0.5 nm or less.

13. The perpendicular magnetic recording medium according to claim 7, further including a soft magnetic supplement layer between the soft magnetic underlayer of the substrate and the nonmagnetic seed layer, wherein the soft magnetic supplement layer has a film thickness of 50 nm or less, and a product of the film thickness and a saturation magnetic flux density is 150 G µm or larger.

14. A method of manufacturing a substrate for a perpendicular magnetic recording medium, the method comprising the steps of:
    providing a nonmagnetic base composed of an aluminum alloy;
    electroless plating a nonmagnetic underlayer composed of an Ni—P alloy on the nonmagnetic base; and
    electroless plating a soft magnetic underlayer consisting of a Ni—P alloy containing phosphorus in a range of 0.5 wt % to 6 wt % on the nonmagnetic underlayer.

15. The method according to claim 14, wherein the soft magnetic underlayer has a thickness of 3 µm or greater.

16. The method according to claim 14, wherein the nonmagnetic underlayer has a thickness ranging 0.5 µm to 7 µm, the soft magnetic underlayer has a thickness of 0.3 µm or greater, and a sum of the thickness of the nonmagnetic underlayer and the thickness of the soft magnetic underlayer is 3 µm or greater.

17. The method according to claim 15, comprising the step of heating the substrate to a temperature of 300° C. or less for 30 minutes or longer after forming the soft magnetic underlayer.

18. The method according to claim 14, further comprising the step of heating the substrate to a temperature of 300° C. or less for 30 minutes or longer after forming the soft magnetic underlayer.

19. The method according to claim 14, further including the step of polishing the surface of the soft magnetic underlayer using free abrasive grains to smooth the surface thereof.

20. The method according to claim 16, further including the step of polishing the surface of the soft magnetic underlayer using free abrasive grains to smooth the surface thereof.

21. The method according to claim 14, wherein the surface of the soft magnetic underlayer has a surface roughness Ra of 0.5 nm or less and a micro waviness Wa of 0.5 nm or less.

22. The method according to claim 20, wherein the surface of the soft magnetic underlayer has a surface roughness Ra of 0.5 nm or less and a micro waviness Wa of 0.5 nm or less.

23. A method of manufacturing a perpendicular magnetic recording medium comprising the steps of:
    forming a substrate by providing a nonmagnetic base composed of an aluminum alloy, electroless plating a nonmagnetic underlayer composed of an Ni—P alloy on the nonmagnetic base, and electroless plating a soft magnetic underlayer consisting of a Ni—P alloy containing phosphorus in a range of 0.5 wt % to 6 wt % on the nonmagnetic underlayer;
    texturing a surface of the soft magnetic underlayer using free abrasive grains; and
    sequentially forming a nonmagnetic seed layer, a magnetic recording layer, and a protective layer by sputtering.

24. The method according to claim 23, wherein the soft magnetic underlayer has a thickness of 3 µm or greater.

25. The method according to claim 23, wherein the nonmagnetic underlayer has a thickness ranging 0.5 µm to 7 µm, the soft magnetic underlayer has a thickness of 0.3 µm or greater, and a sum of the thickness of the nonmagnetic underlayer and the thickness of the soft magnetic underlayer is 3 µm or greater.

26. The method according to claim 24, further comprising the step of heating the substrate to a temperature of 300° C. or less for 30 minutes or longer after forming the soft magnetic underlayer.

27. The method according to claim 23, further comprising the step of heating the substrate to a temperature of 300° C. or less for 30 minutes or longer after forming the soft magnetic underlayer.

28. The method according to claim 23, further including the step of forming a soft magnetic supplement layer on the soft magnetic underlayer before forming the nonmagnetic seed layer, wherein the soft magnetic supplement layer has a film thickness of 50 nm or less, and a product of the film thickness and a saturation magnetic flux density is 150 G µm or larger.

29. The method according to claim 23, wherein the surface of the soft magnetic underlayer has a surface roughness Ra of 0.5 nm or less and a micro waviness Wa of 0.5 nm or less.

30. The method according to claim 25, wherein the surface of the soft magnetic underlayer has a surface roughness Ra of 0.5 nm or less and a micro waviness Wa of 0.5 nm or less.

* * * * *